United States Patent Office 3,461,100
Patented Aug. 12, 1969

---

3,461,100
CONDENSATION PRODUCTS OF ALDEHYDES OR KETONES WITH DIAMINES AND MONOAMINES
Jimmie S. Payne, Jr., and Pete D. Gardner, Austin, Tex., assignors to Tracor, Inc., Austin, Tex., a corporation of Texas
No Drawing. Filed July 2, 1964, Ser. No. 380,041
Int. Cl. C08g 9/04, 15/00
U.S. Cl. 260—72               15 Claims

ABSTRACT OF THE DISCLOSURE

A polymeric material for use as a protective coating, which is insoluble in water but soluble in a common aliphatic hydrocarbon solvent, can be produced by condensing an aldehyde or ketone (formaldehyde) with a diamine (hexamethylene-diamine) in organic medium while continuously removing by-product water.

---

The invention concerns a polymeric material and a method for making same, and also concerns a polymeric material which is suitable as a protective coating on metal objects and the like.

Polymeric materials are in common use at present for a variety of purposes. For example, such materials are frequently employed as structural members, in decorative designs, as wrapping films, and as carriers for chemical agents. Such materials are also employed as protective coatings on various objects such as electrical components.

One possible use for such materials is as a protective coating on metal objects otherwise exposed to deleterious ambient conditions during storage, particularly in storage areas close to salt water. A desirable characteristic of such protective coatings is that they be subject to easy removal by common solvents when the coated metal object is to be used. Conventionally, such prtoective coatings comprise tars or tar-base materials which may be conveniently removed from the metal objects by common hydrocarbons, such as gasoline, kerosine, and the like, or simple alcohols, such as methanol and ethanol. While tars and tar-base materials are water-insoluble and are considered adequate for protective purposes in general, their physical and chemical properties present difficulty in handling and in application to and removal from the object being protectively coated. In addition, the tars and tar-base materials are in general undesirably opaque.

The invention provides a novel polymeric material which in various embodiments, for example, may be employed as a protective coating on a metal object or the like, as an antioxidant, as a corrosion inhibtior, or as a moldable material for structural or design purposes. The invention also provides a method for making the polymeric material, and a method for controlling crosslinking during preparation of a polymeric material.

In general, a composition in accordance with the invention is prepared by the condensation reaction of a carbonyl compound selected from the class consisting of formaldehyde, paraformaldehyde, acetaldehyde, and ketones of the formula:

wherein R and R' are selected from the class consisting of alkyl of from about 1 to about 6 carbons, and when taken together alkylene of from about 4 to about 11 carbons; with at least one diamine or polyamine of the formula:

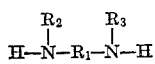

wherein $R_1$ is a group containing from 2 to about 24 carbons with at least two carbons in the chain bonding N— and —N, and is selected from the class consisting of alkylene, cycloalkylene, alkenylene free of double bonds on the carbons having available bonds, that is, the carbons which bond to nitrogen in the formula, cycloalkenylene free of double bonds on the carbons having available bonds, a divalent group of the formula:

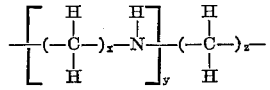

wherein $x$ and $z$ are integers from 2 to 22 and $y$ is an integer from 1 to 11, a divalent group of the formula:

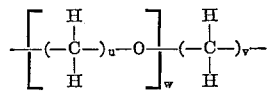

wherein $u$ and $v$ are integers from 2 to 22 and $w$ is an integer from 1 to 11, and alkyl, aryl, alkoxy, alkenyl, alkoxycarbonyl, amino, alkylamino, and dialkylamino substituted derivatives thereof, and $R_2$ and $R_3$ are selected from the class consisting of hydrogen and alkyl of from 1 to about 4 carbons. The reaction is conducted under condensation conditions whereat the carbonyl group in the carbonyl compound reacts at amino groups in the diamine to form the polymeric material.

Formaldehyde or a material which yields formaldehyde, such as paraformaldehyde, is preferably employed to make a polymeric material in accordance with the invention. Thus, formaldehyde may be introduced into the reaction zone by the addition of another compound which breaks down or rearranges to yield formaldehyde under the reaction conditions employed. Acetaldehyde may also be employed as the corbonyl compound, however, as well as the ketones described above. Specific ketones include acetone, ethyl ketone, methyl ethyl ketone, butyl ketone, methyl isoamyl ketone, methyl hexyl ketone, cyclohexanone, cyclopentanone, 2-ethylcyclohexanone, and 2-pentylcyclohexanone.

In general, the amine employed in accordance with the invention is preferably a di-primary-amine having a carbon chain between amino groups of at least two carbons, but a di-secondary-amine having at least two carbons in the chain between the amino groups may also be employed. Preferred amines include hexamethylenediamine, N,N'-diisopropylhexamethylenediamine, and ethylenediamine. Other amines which may be employed, especially to obtain particular properties in the reaction product, include for example: propylenediamine, butylenediamine, heptamethylenediamine, octamethylenediamine, nonamethylenediamine, decamethylenediamine, dodecamethylenediamine, hexadecamethylenediamine, eicosamethylenediamine, tetracosamethylenediamine, N-methylhexamethylenediamine, N,N'-dibutylhexamethylenediamine, N-ethylhexamethylenediamine, ethyleneoxyethylenediamine, diethylenetriamine, hexamethyleneoxyhexamethylenediamine, triethylenetetramine, tetraethylenepentamine, dodecaethylenetridecamine, hendeca(ethyleneoxy)ethylenediamine, hexamethyleneaminohexamethylenediamine, but-2- enylenediamine, oct-4-enylenediamine, 1,4-cyclohexylenediamine, and 1,4-cyclohex-2-enylenediamine.

Groups which do not interfere with the condensation reaction may be substituted on the chain between the amino groups described above without varying from the scope of the invention. For example, alkyl of from one to about four carbons, aryl of up to about ten carbons, alkoxy of from about one to about four carbons, alkenyl of up to about four carbons, alkoxycarbonyl of from about two to about five carbons, amino, alkylamino of up to about four carbons, and dialkylamino of up to about 8 carbons may be substituted on the chain between the amino groups described above, especially when this chain contains at least about 6 carbons, without materially sterically hindering or otherwise interfering with the condensation reaction in accordance with the invention. Of course, primary or secondary amino groups on the chain will tend to lead to crosslinking. The following amines may be employed for example: 1,6-diamino-3-methylhexane, 1,6-diamino-3-methoxyhexane, 1,6-diamino-3-phenylmethylhexane, 1,14-diamino-7-(p-butylphenyl)tetradecane, 1,12-diamino-6-ethenyldodecane, 1,12-diamino-6-methoxycarbonyldodecane, 1,3,6-triaminohexane, 1,6-diamino-3-methylaminohexane, 1,6-diamino-3-dimethylaminohexane, 1,6,12-triamino-8-methyldodecane, and 1,3-amino-6-methylaminohexane.

Polymeric materials in accordance with the invention may be made as moldable solids, liquids, or suitable coating materials by varying the conditions of the reaction and the particular reactants or mixture of reactants employed. In general, ketone reactants lead to liquid polymeric materials. Such liquid products usually have a molecular weight of about 700 or below. If formaldehyde is reacted with a di-primary-amine, an excess of formaldehyde will in general lead to crosslinking and usually moldable products insoluble in both water and hydrocarbons. With a di-secondary-amine, however, crosslinking obviously cannot occur. In general, reaction proceeds at room temperature and without the aid of catalysts although catalysts and elevated or lowered temperatures may be employed. Catalysts and elevated temperatures above about 200° C., however, are not preferred since they frequently lead to competing reactions.

Polymeric materials in accordance with the invention may be prepared, for example, by the following procedures: reaction in an organic solvent such as benzene, interfacial polymerization between an aqueous solution and an immiscible organic solution, and reaction in an aqueous solution. In general, extensively crosslinked polymeric materials insoluble in water and in hydrocarbons result from the latter two methods. If the reactants are contacted in an organic solution, some control of the molecular weight and crosslinking can be achieved by controlling the relative amounts of reactants employed as well as the rate of mixing or addition. Benzene is preferably employed as the organic reaction solvent, although aliphatics and other aromatics, such as toluene and xylene, may be employed.

For example, if formaldehyde or a compound yielding formaldehyde is added rapidly to a benzene solution of a di-primary-amine, an insoluble polymeric material will usually result because of localized excess of formaldehyde. If a one to one mole ratio of these reactants is carefully condensed, a liquid product will generally be obtained. If a very slight molar excess, such as about 2 percent or up to about 7 percent, of the formaldehyde is carefully added to a benzene solution of a di-primary-amine such as hexamethylenediamine, a material insoluble in water but soluble in common aliphatic hydrocarbon solvents can be obtained. The addition rate of the aldehyde, however, must be carefully controlled as the required excess of aldehyde is approached, since control of the reaction is very difficult, although possible. Slightly more formaldehyde invariably results in the formation of an insoluble crosslinked polymeric material. A slurry of paraformaldehyde in benzene is preferably employed to introduce the formaldehyde into the reaction zone. If a hard, moldable material insoluble in water and in hydrocarbons is desired, a high molar ratio of carbonyl compound to amine, such as at least about 2 to 1, is preferably employed. At lower molar ratios, such as between about 1.1 and 2 parts carbonyl compound to 1 part amine, solids not quite as hard will normally be produced.

In the interfacial polymerization, an aqueous solution of formaldehyde, for example, is covered carefully with a solution of amine in benzene or other such immiscible organic solvent, and the polymeric material formed can be removed from the interface by manual extraction.

If a film-forming material is desired, control of crosslinking is preferably accomplished by the addition of crosslinking blocking agents rather than by control of the ratio of reactants and the rate of addition. Crosslinking can be controlled by adding to the basic reactants an amine having a single functional amino group thereon, such as a mono-primary- or mono-secondary-amine. Of course, to avoid undesirable reactions the amine should be free of other groups which are functional under the present reaction conditions. For example, alkylamines, dialkylamines, cycloalkenylamines and alkenylamines free of double bonds on carbons bonded to nitrogen, cycloalkylamines, alkyleneimines, and the like, or substituted derivatives thereof with groups which do not interfere with the intended reaction, may be employed as blocking agents. Such groups include alkyl, aryl, alkoxy, alkenyl, alkoxycarbonyl, and dialkylamino. In general, amines for use either as blocking agents or as the main reactant should not contain phenyl groups on nitrogen or double bonds on the carbon bonded to nitrogen, if side reactions are to be avoided.

It is believed that a mono-primary-amine interferes with crosslinking by condensing with two molecules of carbonyl compound and two hydrogens located individually on two nitrogens in the polymeric chain, thus forming a ring composed of three nitrogens and three carbons. Mono-secondary-amines condense with a single hydrogen on the chain and a molecule of the carbonyl compound to block crosslinking.

In general, the amine blocking agent can contain up to about 24 carbons or more. Specific examples include cyclohexylamine, n-hexylamine, piperidine, dibutylamine, didodecylamine, ethylamine, cyclohex-2-enylamine, hex-2-enylamine, 6-phenylhexylamine, 2-methylhexylamine, 2-methoxyhexylamine, 3-ethenylhexylamine 3-methoxycarbonylhexylamine, and 3-dimethylaminohexylamine.

In the preparation of film-forming polymeric materials, a preferred mole ratio of between about 0.75 and about 1 part diamine to about 1 part monoamine is preferred, but any amount which will control or minimize crosslinking sufficiently is satisfactory. Of course, carbonyl compound should be added to such a mixture in at least a quantity sufficient to react with the mixture. Materials produced in accordance with this procedure in general are insoluble in water but soluble in one or more common aliphatic hydrocarbon solvents such as cyclohexane and n-heptane, and exhibit protective coating properties including the characteristic of bonding to metals. The carbonyl and amine reactants are preferably chosen, however, such that a carbon to nitrogen atom ratio of at least about three to one exists in the condensation product. Carbon to nitrogen ratios lower than this usually result in a water soluble product. In this regard, the diamine reactant preferably contains at least about 4 carbons associated with the chain between nitrogens to effect the final preferred ratio.

Thus, a film-forming polymeric material in accordance with the invention containing at least three carbons to each nitrogen will be insoluble in water but soluble in aliphatic hydrocarbons such as cyclohexane, n-heptane, petroleum ether, and ligroin. When coated on a metal object, the film-forming polymeric materials exhibit good protective properties and may be readily removed by dissolution in common aliphatic hydrocarbons, or simple alcohols, gasoline, kerosene, lubricating oils, and the like. Moldable polymeric solids in accordance with the invention may be employed as structural or esthetic members, and the liquid polymeric materials in accordance with the invention as well as solutions of the other polymeric materials may be employed as corrosion inhibitors or antioxidants in materials such as lubricating oil. Another use of the liquid polymeric materials of low carbon to nitrogen atom ratio, which are usually derived from a ketone, is as a carrier of amine in nonvolatile form. Since such liquids are usually hydrolyzable, addition of water to the polymeric material at the desired time will release the amine for use in reactions and the like.

Investigation by infrared analysis taken with the nature of the reactants indicates that condensation products in accordance with the invention contain an

linkage. Thus, the condensation products contain as a unit of chain structure:

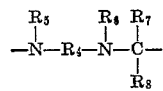

or

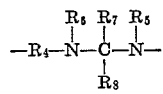

wherein $R_4$ corresponds to the $R_1$ groups in the diamine reactant previously defined, and $R_7$ and $R_8$ are either hydrogen, alkyl of from 1 to 6 carbons, or when taken together alkylene of from about 4 to about 11 carbons, these two groups being derived from the aldehyde or ketone reactant. $R_5$ and $R_6$ can be an unreacted hydrogen from the amine reactant; alkyl of from 1 to 4 carbons in the case of a secondary amine reactant; or a group attached as a result of the condensation reaction when a primary amine is the original reactant. Thus, for example, $R_5$ and $R_6$ can be another unit as shown which crosslinks along with a molecule of the carbonyl reactant to another chain, or which begins another chain. When monofunctional amines are added to retard crosslinking, $R_5$ and $R_6$ may be a group derived from these monofunctional amines, thereby eliminating any further chain growth. In this regard, the reaction of formaldehyde, a diamine, and cyclohexylamine, for example, is believed to lead to the following chain unit:

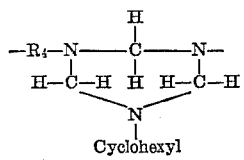

Of course, when the $R_1$ group in the reactant diamine (corresponding to the $R_4$ group in the instant discussion) contains a functional amino group, chain growth or crosslinking can originate at this point.

The N—C—N linkage in the polymeric materials of the invention exhibits a moderately strong absorption peak broadly at about 8.9 microns in infrared spectrum.

The following examples illustrate the invention more specifically.

Example I 300 grams of a 10% by weight solution of formaldehyde in water was mixed, with rapid stirring, with 580 grams of a 10% by weight solution of hexamethylenediamine in water in an open vessel at room temperature. A stringy white polymer separated almost immediately, and this polymer was removed by decantation and then washed and dried. The dried material was then molded with the aid of an elevated temperature of about 150° C. and the application of hydraulic pressure at about 1,000 p.s.i.g. The polymer was insoluble in water and in benzene.

Example II 30 grams of 10% by weight aqueous formaldehyde was placed in a 100 milliliter beaker, and 10 milliliters of benzene was then carefully added to cover the aqueous formaldehyde solution. 50 milliliters of a 10% by weight hexamethylenediamine solution was then carefully added to the benzene. A polymer film formed at the interface between liquids and, as it formed, it was carefully removed from the interface by continuous manual extraction. The film thus formed and extracted was a moldable, solid, opaque polymeric material.

Example III 11.6 grams of hexamethylenediamine in 250 milliliters of benzene was refluxed in a laboratory flask outfitted with a heating mantle and an azeotroping distillation head. Over a period of one hour, during refluxing, a slurry of 3.1 grams of paraformaldehyde in 100 milliliters of benzene was added, and refluxing was then continued until no additional water was taken overhead, i.e., about one additional hour. A solution of polymeric material resulted which on evaporation yielded a clear film. The polymeric material and benzene was applied to a test specimen and the benzene was then permitted to evaporate under atmospheric conditions. When evaporation was complete, it was found that a transparent polymeric film of good protective characteristics was deposited on the test specimen. The film thus applied was subjected to test procedures to determine its efficacy as a protective coating and the results obtained were quite satisfactory.

Example IV

A mixture of 6.96 grams of hexamethylenediamine and 8 grams of cyclohexylamine in 250 milliliters of benzene was heated to reflux condition. During refluxing a slurry of 6 grams of paraformaldehyde in 100 milliliters of benzene was slowly added over a period of one hour. By-product water was removed by means of an azeotroping distillation head, and refluxing was continued until no further water was produced. The resultant solution of polymeric material was then concentrated, applied to a test object, and dried to a transparent film. The test object was subjected to testing in a salt water bath and found to be quite satisfactory as a protective film.

After the film had been left applied to the test object for some days, it was washed with water and found to be water-insoluble and nonhydrolyzable, even in boiling water. Then, the object was washed with cyclohexane whereupon the protective film was immediately dissolved in the cyclohexane and conveniently removed from the test object.

Example V

A solution of 9.28 grams of hexamethylenediamine and 8.0 grams of n-hexylamine in 200 milliliters of benzene was heated to boiling. A slurry of 7.2 grams of paraformaldehyde in 100 milliliters of benzene was slowly added and with the assistance of an azeotroping distillation head by-product water was removed until reaction completion. A polymeric composition was obtained in solution with benzene. The material thus obtained was applied to a test object, tested, and later removed with cyclohexane from the test object. As in the preceding examples, excellent results were obtained.

Example VI

N,N'- diisopropylhexamethylenediamine and paraformaldehyde were reacted in benzene in accordance with procedures described in Example III. The quantity of reactants employed and the results obtained are shown in Table I below:

TABLE I
Products derived from N,N'-diisopropylhexamethylenediamine

| Test No. | Moles amine | Moles formaldehyde | Average molecular weight of product | Comments |
|---|---|---|---|---|
| 1 | 0.05 | 0.05 | 362 | Liquid product. |
| 2 | 0.05 | 0.055 | 402 | Do. |
| 3 | 0.05 | 0.045 | 415 | Do. |

Example VII

Hexamethylenediamine, cyclohexylamine, and formaldehyde were reacted in benzene in accordance with the procedures described in Example V. The quantities of reactants and the results obtained are shown in Table II below:

TABLE II

[Products Derived From Hexamethylenediamine, Cyclohexylamine, and Formaldehyde]

| Test No. | Moles hexamethylenediamine | Moles formaldehyde | Moles cyclohexylamine | Average molecular weight of product | Type of product |
| --- | --- | --- | --- | --- | --- |
| 1 | 0.06 | 0.20 | 0.08 | 1,032 | Polymeric, slightly tacky film, very soluble in aliphatics. |
| 2 | 0.02 | 0.204 | 0.16 | 450 | Liquid product. |
| 3 | 0.04 | 0.204 | 0.12 | 806 | Product very soluble in aliphatics, dries to transparent film of varying degrees of tackiness. Shows promising protective properties in preliminary corrosion tests. |
| 4 | 0.06 | 0.204 | 0.08 | 990 | |
| 5 | 0.06 | 0.208 | 0.08 | 1,092 | |
| 6 | 0.05 | 0.208 | 0.10 | 911 | |
| 7 | 0.065 | 0.20 | 0.07 | 1,067 | |
| 8 | 0.064 | 0.208 | 0.07 | 1,131 | |
| 9 | 0.05 | 0.20 | 0.10 | 939 | |
| 10 | 0.055 | 0.208 | 0.09 | 1,224 | |
| 11 | 0.07 | 0.20 | 0.06 | | Crosslinked polymer insoluble in cyclohexane. |

Example VIII

Ethylenediamine and acetone were condensed in benzene solution in accordance with the procedures described in Example III except that since the diamine boils overhead the loss was continuously made up in the benzene solution. A polymeric liquid was obtained with the average molecular weight in several tests ranging from about 200 to about 300.

Example IX

Acetaldehyde and hexamethylenediamine were reacted in benzene solution in accordance with the procedures of Example III. After evaporation of the benzene, a rubbery product insoluble in cyclohexane was obtained.

As explained above, polymeric materials in accordance with the invention can exhibit a variety of useful properties. It will be apparent, however, that polymeric materials in accordance with the invention can be modified if desired by blending with other polymeric materials, or by the addition of modifiers, extenders, colorants, and the like to effect a particular property for a particular use. For example, a film-forming polymeric material in accordance with the invention blended with low molecular weight polystyrene exhibits good corrosion protective properties, even better than the properties of either polymer alone.

What is claimed is:

1. A material suitable for use as a protective coating, said material comprising the condensation product of a mixture comprising formaldehyde; at least one diamine of the formula:

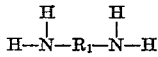

wherein $R_1$ is a group containing from about 4 to about 24 carbons with at least 2 carbons in the chain bonding N— and —N, and is selected from the class consisting of alkylene, cycloalkylene, alkenylene free of double bonds on the carbons having available bonds, cycloalkenylene free of double bonds on the carbons having available bonds, a divalent group of the formula:

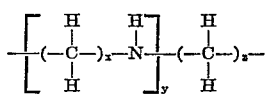

wherein $x$ and $z$ are integers from 2 to 22 and $y$ is an integer from 1 to 11, a divalent group of the formula:

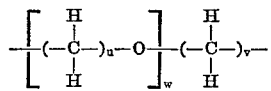

wherein $u$ and $v$ are integers from 2 to 22 and $w$ is an integer from 1 to 11, and alkyl, aryl, alkoxy, alkenyl, alkoxycarbonyl, amino, alkylamino, and dialkylamino substituted derivatives thereof; and at least one monoamine having a single functional amino group thereon without other functional groups and selected from the class consisting of primary amines and secondary amines; while said mixture is maintained under condensation conditions, at temperatures less than about 200° C., whereat the carbonyl group in said formaldehyde reacts at amino groups in said diamine and said monoamine to form a condensation product insoluble in water but soluble in a common aliphatic hydrocarbon solvent and having a carbon to nitrogen atom ratio of at least about 3 to 1.

2. The material defined in claim 1 wherein said diamine is present in said mixture in a molar ratio of between about 0.75 and about 1 part diamine to 1 part of said monoamine.

3. A material suitable for use as a protective coating, said material comprising the condensation product of a mixture comprising formaldehyde, hexamethylenediamine, and cyclohexylamine; while said mixture is maintained under condensation conditions, at temperatures less than about 200° C., whereat the carbonyl group in said formaldehyde reacts at amino groups in said hexamethylenediamine and said cyclohexylamine to form a condensation product insoluble in water but soluble in a common aliphatic hydrocarbon solvent.

4. A material suitable for use as a protective coating, said material comprising the condensation product of a mixture comprising formaldehyde, hexamethylenediamine, and n-hexylamine; while said mixture is maintained under condensation conditions, at temperatures less than about 200° C., whereat the carbonyl group in said formaldehyde reacts at amino groups in said hexamethylenediamine and said n-hexylamine to form a condensation product insoluble in water but soluble in a common aliphatic hydrocarbon solvent.

5. A method for producing a polymeric material, which method comprises reacting a mixture of at least one carbonyl compound selected from the class consisting of formaldehyde, paraformaldehyde, acetaldehyde, and ketones of the formula:

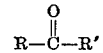

wherein R and R' are selected from the class consisting of alkyl of about 1 to about 6 carbons, and when taken together alkylene of from about 4 to about 11 carbons; at least one diamine of the formula:

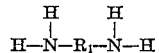

wherein $R_1$ is a group containing from about 2 to about 24 carbons with at least 2 carbons in the chain bonding N— and —N, and is selected from the class consisting of alkylene, cycloalkylene, alkenylene free of double bonds on the carbons having available bonds, cycloalkenylene free of double bonds on the carbons having available bonds, a divalent group of the formula:

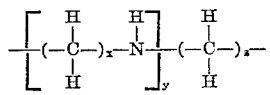

wherein $x$ and $z$ are integers from 2 to 22 and $y$ is an integer from 1 to 11, a divalent group of the formula:

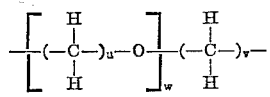

wherein $u$ and $v$ are integers from 2 to 22 and $w$ is an integer from 1 to 11, and alkyl, aryl, alkoxy, alkenyl, alkoxycarbonyl, amino, alkylamino, and dialkylamino substituted derivatives thereof; and a monoamine having a single functional amino group without other functional groups and selected from the class consisting of primary amines and secondary amines, said monoamine being present in an amount sufficient to control cross-linking; under conditions, at temperatures less than about 200° C., whereat the carbonyl group in said carbonyl compound reacts at amino groups in said diamine and said monoamine to form said polymeric material.

6. A method for preparing a polymeric material suitable for use in a protective coating composition, which method comprises reacting a mixture of formaldehyde; at least one diamine of the formula:

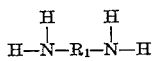

wherein $R_1$ is a group containing from about 4 to about 24 carbons with at least 2 carbons in the chain bonding N— and —N, and is selected from the class consisting of alkylene, cycloalkylene, alkenylene free of double bonds on the carbons having available bonds, and cycloalkylene free of double bonds on the carbons having available bonds and at least one monoamine having a single functional amino group without other functional groups and selected from the class consisting of primary amines and secondary amines, said monoamine being present in said mixture in an amount to minimize crosslinking sufficiently to yield a polymeric material having protective coating properties; under condensation conditions, at temperatures less than about 200° C., whereat the carbonyl group in said formaldehyde reacts at amino groups in said diamine and said monoamine to form a condensation product having protective coating properties.

7. A method for preparing a polymeric material suitable for use in a protective coating composition, which method comprises reacting a mixture of formaldehyde, hexamethylenediamine, and cyclohexylamine in an amount to minimize crosslinking sufficiently to yield a polymeric material having protective coating properties; under condensation conditions, at temperatures less than about 200° C., whereat the carbonyl group in said formaldehyde reacts at amino groups in said hexamethylenediamine and said cyclohexylamine to form a condensation product insoluble in water but soluble in a common aliphatic hydrocarbon solvent.

8. A method for preparing a polymeric material suitable for use in a protective coating composition, which method comprises reacting a mixture of formaldehyde, hexamethylenediamine, and n-hexylamine in an amount to minimize crosslinking sufficiently to yield a polymeric material having protective coating properties; under condensation conditions, at temperatures less than about 200° C., whereat the carbonyl group in said formaldehyde reacts at amino groups in said hexamethylenediamine and said n-hexylamine to form a condensation product insoluble in water but soluble in a common aliphatic hydrocarbon solvent.

9. A method for controlling crosslinking in a condensation reaction of a mixture of a di-primary-amine and a carbonyl compound selected from the class consisting of aldehydes and ketones, which method comprises incorporating in said mixture, in an amount to control crosslinking sufficiently, a monoamine having a single functional amino group without other functional groups and selected from the class consisting of primary amines and secondary amines.

10. The method defined in claim 9 wherein said monoamine is cyclohexylamine.

11. The method defined in claim 9 wherein said monoamine is n-hexylamine.

12. A method for controlling crosslinking in a condensation reaction of a mixture of a di-primary-amine and formaldehyde, which method comprises incorporating in said mixture, in an amount to control crosslinking sufficiently, a monoamine having a single functional amino group without other functional groups and selected from the class consisting of primary amines and secondary amines.

13. A method for producing a material suitable for use in a protective coating, which method comprises reacting in an aromatic medium immiscible with water at least one mono-primary-amine having a single functional amino group thereon without other functional groups and a di-primary-amine with an aromatic slurry of paraformaldehyde while removing the by-product water from said medium, said di-primary-amine having a carbon chain between amino groups of at least four carbons and consisting of carbon, nitrogen, and hydrogen, under condensation conditions, at temperatures less than about 200° C., whereat a condensation product insoluble in water but soluble in a common aliphatic hydrocarbon solvent is formed.

14. The method defined in claim 13 wherein said aromatic medium and said aromatic slurry comprise one of benzene, toluene, and xylene.

15. The method defined in claim 14 wherein said di-primary-amine is hexamethylenediamine.

References Cited

UNITED STATES PATENTS

| | | | |
|---|---|---|---|
| 2,652,367 | 9/1953 | Adelson | 252—46.7 |
| 2,352,387 | 6/1944 | Hopff | 260—65 |
| 2,390,153 | 6/1940 | Kern | 260—72 |

WILLIAM H. SHORT, Primary Examiner

L. L. LEE, Assistant Examiner

U.S. Cl. X.R.

117—132; 260—33, 65, 72